US012698609B2

(12) United States Patent
Würner et al.

(10) Patent No.: US 12,698,609 B2
(45) Date of Patent: Aug. 4, 2026

(54) WHEEL ASSEMBLY FOR A SOIL COMPACTOR

(71) Applicant: Hamm AG, Tirschenreuth (DE)

(72) Inventors: Christian Würner, Tirschenreuth (DE); Rainer Krockauer, Plössberg (DE); Gerhard Mahler, Windischeschenbach (DE)

(73) Assignee: Hamm AG, Tirschenreuth (DE)

( * ) Notice: Subject to any disclaimer, the term of this patent is extended or adjusted under 35 U.S.C. 154(b) by 755 days.

(21) Appl. No.: 18/122,203

(22) Filed: Mar. 16, 2023

(65) Prior Publication Data

US 2023/0295890 A1     Sep. 21, 2023

(30) Foreign Application Priority Data

Mar. 18, 2022     (DE) ..................... 10 2022 106 321.6

(51) Int. Cl.
*E02D 3/026*          (2006.01)
*B60B 37/10*          (2006.01)

(52) U.S. Cl.
CPC ............ *E02D 3/0265* (2013.01); *B60B 37/10* (2013.01); *B60Y 2200/413* (2013.01)

(58) Field of Classification Search
CPC .. E02D 3/0265; B60B 37/10; B60Y 2200/413
USPC ........................................ 404/126
See application file for complete search history.

(56) References Cited

U.S. PATENT DOCUMENTS

| | | | | |
|---|---|---|---|---|
| 5,494,375 A | * | 2/1996 | Yates | E01C 19/27 |
| | | | | 180/20 |
| 2007/0206993 A1 | * | 9/2007 | Tyhy | E01C 19/26 |
| | | | | 404/128 |
| 2023/0295890 A1 | * | 9/2023 | Würner | E01C 19/27 |
| | | | | 301/5.1 |

FOREIGN PATENT DOCUMENTS

| | | | | |
|---|---|---|---|---|
| CN | 206784125 U | | 12/2017 | |
| CN | 220433335 U | | 2/2024 | |
| DE | 1265184 B | | 4/1968 | |
| GB | 1251271 A | * | 10/1971 | ............. E02D 3/026 |
| JP | H08132809 A | | 5/1996 | |
| SU | 00237738 A1 | | 9/1969 | |

OTHER PUBLICATIONS

Office Action of Chinese Serial No. 202310260079.0 issued May 9, 2025, 8 pages.

(Continued)

*Primary Examiner* — Christopher J Sebesta
*Assistant Examiner* — Kalpit C. Patel
(74) *Attorney, Agent, or Firm* — Rankin, Hill & Clark LLP

(57)          ABSTRACT

A wheel assembly for a soil compactor comprises a plurality of wheels (20) mounted in succession on a main wheel carrier (24) in the direction of an operating wheel axis of rotation (B), wherein at least one third wheel, which is arranged between a first wheel and a second wheel in the direction of the operating wheel axis of rotation (B), forms an auxiliary assembly wheel (20₅) and is mounted on the main wheel carrier (24) by means of an auxiliary wheel carrier (34), wherein the auxiliary wheel carrier (34) is firmly coupled to the main wheel carrier (24) in an auxiliary wheel operating state and is pivotable about a pivot axis and displaceable in the direction of the pivot axis in relation to (Continued)

the main wheel carrier (24) in an auxiliary wheel assembly state.

16 Claims, 4 Drawing Sheets

(56)                     References Cited

OTHER PUBLICATIONS

Search Report of Chinese Serial No. 202310260079.0 issued May 6, 2025, 3 pages.

\* cited by examiner

WHEEL ASSEMBLY FOR A SOIL COMPACTOR

The present invention relates to a wheel assembly for a soil compactor.

Soil compactors designed as so-called rubber-wheeled rollers comprise at least one group of wheels generally designed as rubber wheels on a compactor frame, which wheels can be rotated about an operating wheel axis of rotation during compaction operation and thereby compact material to be compacted, such as asphalt, by static loading. In order to achieve full-surface compaction of the material to be compacted, the wheels of such a wheel assembly have comparatively small spacing in the direction of the operating wheel axis of rotation, which spacing is generally less than the width of such a wheel in the direction of the operating wheel axis of rotation.

The object of the present invention is to provide a wheel assembly for a soil compactor which also allows easy access to wheels positioned in a central region of the wheel assembly in the direction of an operating wheel axis of rotation in order to carry out assembly or repair work.

According to the invention, this object is achieved by a wheel assembly for a soil compactor, comprising a plurality of wheels mounted in succession on a main wheel carrier in the direction of an operating wheel axis of rotation, wherein at least one third wheel, which is arranged between a first wheel and a second wheel in the direction of the operating wheel axis of rotation, forms an auxiliary assembly wheel and is mounted on the main wheel carrier by means of an auxiliary wheel carrier, wherein the auxiliary wheel carrier is firmly coupled to the main wheel carrier in an auxiliary wheel operating state and is pivotable about a pivot axis and displaceable in the direction of the pivot axis in relation to the main wheel carrier in an auxiliary wheel assembly state.

In particular, if repairs have to be carried out on the at least one auxiliary assembly wheel itself or on a wheel following it in the direction of the operating wheel axis of rotation, i.e., the first wheel or the second wheel, or if such a wheel has to be changed, it can be brought into an assembly position, by pivoting or displacing the auxiliary wheel carrier, in the auxiliary wheel assembly state, in which assembly position the at least one auxiliary assembly wheel mounted on the auxiliary wheel carrier is pivoted out of the area of the other wheels of the wheel assembly thus creating easy access to the at least one auxiliary assembly wheel or the first and second wheel.

For a structure that is easy to implement and operate, it is proposed that the pivot axis be oriented essentially parallel to the operating wheel axis of rotation.

In order to ensure a fixed, defined positioning of the auxiliary wheel carrier for carrying out a compaction operation, it is proposed that the auxiliary wheel carrier be firmly coupled to the main wheel carrier in a fixed coupling region in the auxiliary wheel operating state by means of a plurality of coupling elements, preferably bolts.

For this purpose, for example, the fixed coupling region can comprise at least one first coupling plate on the auxiliary wheel carrier and at least one second coupling plate, which can be firmly coupled to the at least one first coupling plate by the coupling elements, on the main wheel carrier.

In order to easily bring the auxiliary wheel carrier into the assembly position in the auxiliary wheel assembly state, it is proposed that the auxiliary wheel carrier be coupled to the main wheel carrier in a pivot coupling region so that it can pivot about the pivot axis and be displaceable in the direction of the pivot axis.

For this purpose, the pivot coupling region can comprise a pivoting/sliding shaft, which is longitudinally extended in the direction of the pivot axis, on the main wheel carrier and at least one pivoting/sliding sleeve, which is guided on the pivoting/sliding shaft so as to be pivotable about the pivot axis and displaceable in the direction of the pivot axis, on the auxiliary wheel carrier.

For an embodiment that is stable and also defines displacement end positions, the pivoting/sliding shaft can be mounted on the main wheel carrier in each of its axial end regions by means of a shaft carrier element.

In order to ensure fixed, stable positioning in the auxiliary wheel operating state on the one hand, but also to be able to pivot and slide in the auxiliary wheel assembly state on the other hand, it is proposed that the pivot axis be offset transversely to a vertical direction with respect to the operating wheel axis of rotation.

Since the aforementioned offset generally means that, when the auxiliary wheel carrier is pivoted into the assembly position, the at least one auxiliary assembly wheel mounted thereon is initially lowered in the vertical direction with respect to the other wheels of the wheel assembly, it is proposed that the auxiliary wheel carrier be variable in length to change a distance between the pivot axis and an auxiliary wheel axis of rotation of the at least one auxiliary wheel assembly mounted on the auxiliary wheel carrier in order to avoid the requirement of having to first raise the entire soil compactor.

For this purpose, the auxiliary wheel carrier can comprise a first auxiliary wheel carrier element, which is mounted on the main wheel carrier such that it can pivot about the pivot axis and be displaced in the direction of the pivot axis, and a second auxiliary wheel carrier element, which can be displaced on the first auxiliary wheel carrier element essentially in the direction of an auxiliary wheel carrier longitudinal axis with respect to the first auxiliary wheel carrier element.

In order to ensure stable positioning of the at least one auxiliary assembly wheel mounted on the auxiliary wheel carrier during compaction operation, the second auxiliary wheel carrier element can be lockable in an operational displacement position with respect to the first auxiliary wheel carrier element. Furthermore, a movement of the two auxiliary wheel carrier elements relative to one another can be achieved in that the second auxiliary wheel carrier element is displaceable relative to the first auxiliary wheel carrier element by means of an actuator, for example a piston/cylinder assembly.

In the wheel assembly constructed according to the present invention, a first pair of wheels may be mounted on the main wheel carrier by means of a first wheel pair carrier, and a second pair of wheels may be mounted on the main wheel carrier via a second wheel pair carrier. One wheel of the first pair of wheels can form the first wheel, and one wheel of the second pair of wheels can form the second wheel. The auxiliary wheel carrier with the at least one auxiliary assembly wheel mounted thereon is therefore arranged between the two pairs of wheels in such an embodiment. Advantageously, in such an embodiment, the first wheel pair carrier and the second wheel pair carrier are fixed to the main wheel carrier in an essentially rigid manner, i.e., their position cannot be changed.

The invention also relates to a soil compactor with at least one wheel assembly constructed according to the invention.

Two wheel assemblies can be arranged one after the other on a compactor frame in a longitudinal direction of the soil compactor, with at least one of the wheel assemblies being designed according to the invention. The wheels of a first wheel assembly of the two wheel assemblies are advantageously offset with respect to the wheels of a second wheel assembly of the two wheel assemblies in a soil compactor transverse direction which is essentially orthogonal to the soil compactor longitudinal direction.

The present invention is described in detail below with reference to the attached figures. In the figures.

Figure 1:
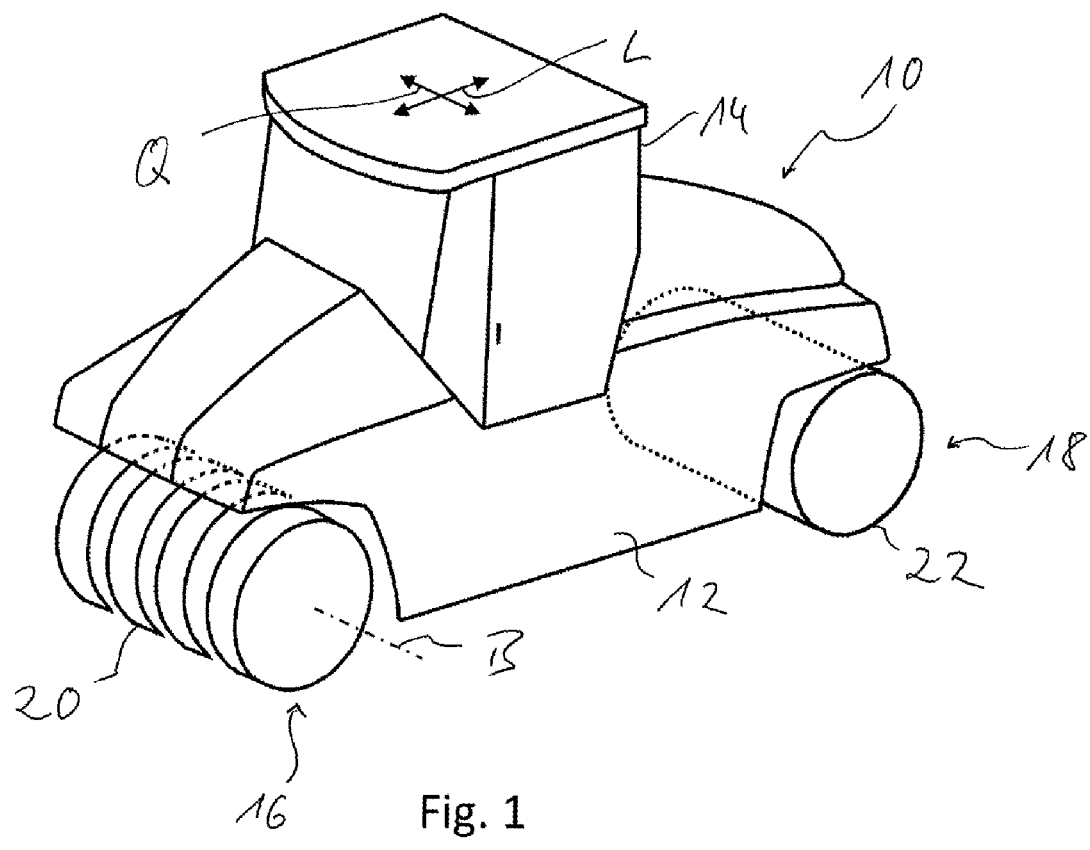
FIG. 1 shows a basic representation of a soil compactor constructed with a wheel assembly having a plurality of wheels.

In FIG. 1, a soil compactor constructed in the manner of a rubber-wheeled roller is denoted generally by 10. On a compactor frame 12, the soil compactor 10 comprises a control station 14 in which an operator can sit to operate the soil compactor 10. A wheel assembly 16 and a compactor roller 18 are arranged, spaced apart from one another, on the compactor frame 12 in a longitudinal direction L of the soil compactor. The wheel assembly 16 comprises a plurality of wheels 20 which follow one another in a soil compactor transverse direction Q or in the direction of an operating wheel axis of rotation B and are generally designed as rubber wheels. The compactor roller 18 is designed with a roller casing 22 in the soil compactor transverse direction Q, which is, for example, continuous.

It should be noted that the soil compactor 10 could also be constructed with two such wheel assemblies 16, wherein the wheels 20 of the individual wheel assemblies 16 can be offset from one another in the transverse direction Q of the soil compactor, so that when the soil to be compacted is driven over, the entire width of the soil compactor 10 can be detected and compacting can be performed over the entire width.

In order to steer the soil compactor 10, it is possible to mount the wheel assembly 16 and/or compactor roller 18 on a machine frame 12 so as to pivot about a respective pivot axis, so that, for example, the soil compactor 10 can be steered both by pivoting the wheel assembly 16 with respect to compactor frame 12 about a steering axis assigned thereto and by pivoting the compactor roller 22 or, if applicable, the additional wheel assembly 16 with respect to the soil compactor frame 12 about a steering axis assigned thereto. In an alternative embodiment, the soil compactor 10 or the compactor frame 12 thereof could be constructed with a front carriage and a rear carriage, which are pivotably connected to one another in the area of an articulated joint and trigger a steering movement of the soil compactor 10 by pivoting relative to one another. With such an embodiment, the wheel assembly 16 and the compactor roller 18 or possibly the further wheel assembly 16 can be mounted essentially rigidly on the front carriage or rear carriage, i.e., not be pivotable about a steering axis.

FIGS. 2 to 6 show such a wheel assembly 16 for the soil compactor 10. The wheel assembly 16 comprises a main wheel carrier 24 which, depending on the embodiment of the soil compactor 10, can be mounted rigidly on the compactor frame 12 or can be pivoted about a steering axis. On the compactor main frame 24, a first wheel pair carrier 26 and a second wheel pair carrier 28 are arranged essentially rigidly and spaced apart from one another in the direction of the operating wheel axis of rotation B. A pair of wheels 30, 32 with two wheels $20_1$, $20_2$, $20_3$, $20_4$ is rotatably mounted on each of the wheel pair carriers 26, 28 about the operating wheel axis of rotation B. There is an auxiliary wheel carrier 34 mounted on the main wheel carrier 24 between wheel $20_2$ of the first pair of wheels 30, which forms a first wheel within the meaning of the present invention, and wheel $20_3$ of the second pair of wheels, which forms a second wheel within the meaning of the present invention. An auxiliary assembly wheel $20_5$ forming a third wheel within the meaning of the present invention is mounted on the auxiliary wheel carrier 34 so as to be rotatable about an auxiliary wheel axis of rotation H. In the compacting operation of the soil compactor 10, the auxiliary wheel carrier 34 is in an auxiliary wheel operating state in which the auxiliary wheel axis of rotation H corresponds to the operating wheel axis of rotation B, so that all wheels 20 of the wheel assembly 16 rotate about the same axis of rotation.

The auxiliary wheel carrier 34 can be firmly coupled to the main wheel carrier 24 in a fixed coupling region generally designated as 36. For this purpose, the auxiliary wheel carrier 34 has a first coupling plate 40 which can be firmly connected or coupled to a second coupling plate 41 of the main wheel carrier 24 by means of a plurality of fastening elements 38 embodied, for example, as bolts. If this state of fixed coupling is established, the auxiliary wheel carrier 34 is in an auxiliary wheel operating state in which, in order to carry out a compaction operation or generally to move the soil compactor 10 over soil, all the wheels 20 of the wheel assembly 16 rotate about the same axis of rotation, namely the operating wheel axis of rotation B.

The auxiliary wheel carrier 34 is coupled to the main wheel carrier 24 by means of a pivot coupling region 42 in such a way that, in the auxiliary wheel assembly state, i.e., when the coupling is not established in the fixed coupling region 36, the auxiliary wheel carrier can be pivoted about a pivot axis S and is displaceable in the direction of the pivot axis S with respect to the main wheel carrier 24. For this purpose, the pivot coupling region 42 has a pivoting/sliding shaft 44 which is firmly mounted on the main wheel carrier 24 in its two axial end regions by means of a shaft carrier element 46, 48. A pivoting/sliding sleeve 50, which can be displaced in the direction of the pivot axis S and rotated about the pivot axis S on the pivoting/sliding shaft 44, is provided on the auxiliary wheel carrier 34.

Figure 3:
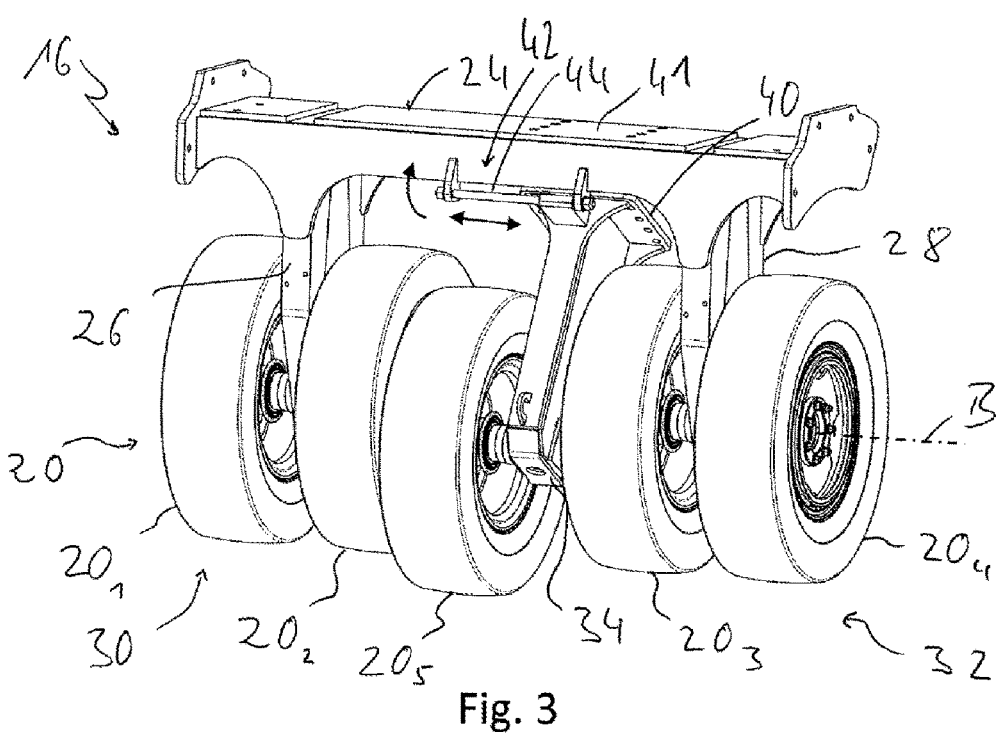
FIG. 3 shows a perspective view of the wheel assembly.
Figure 4:
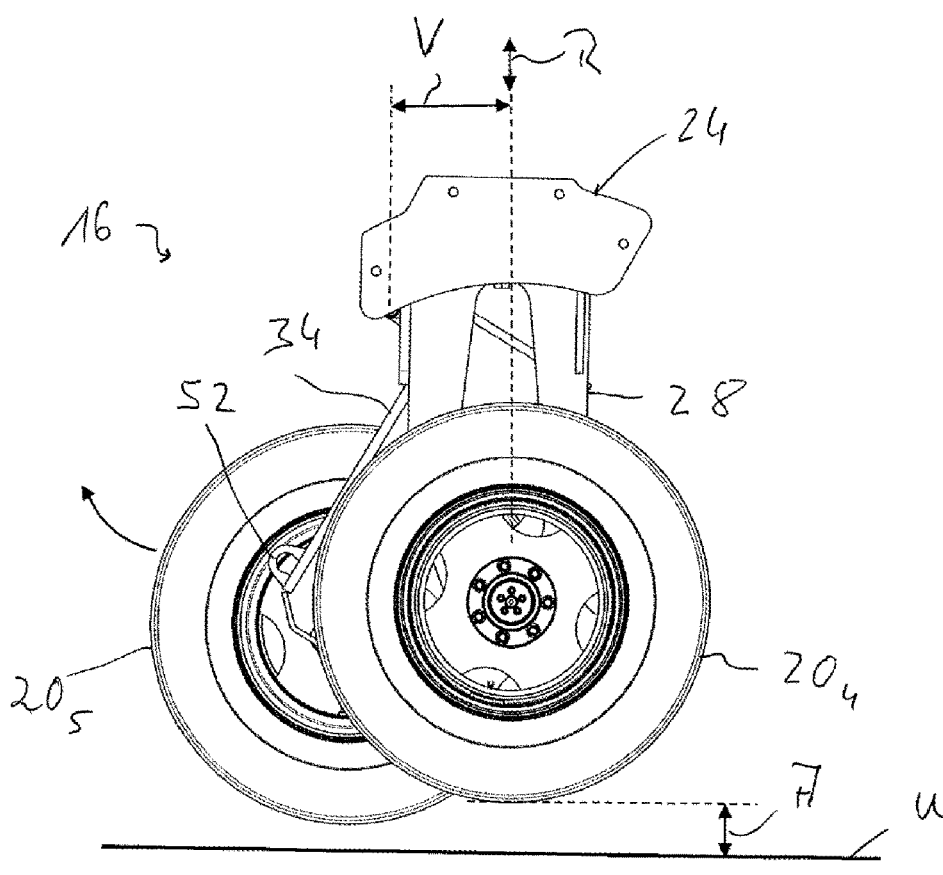
FIG. 4 shows an axial view of the wheel assembly.
Figure 5:
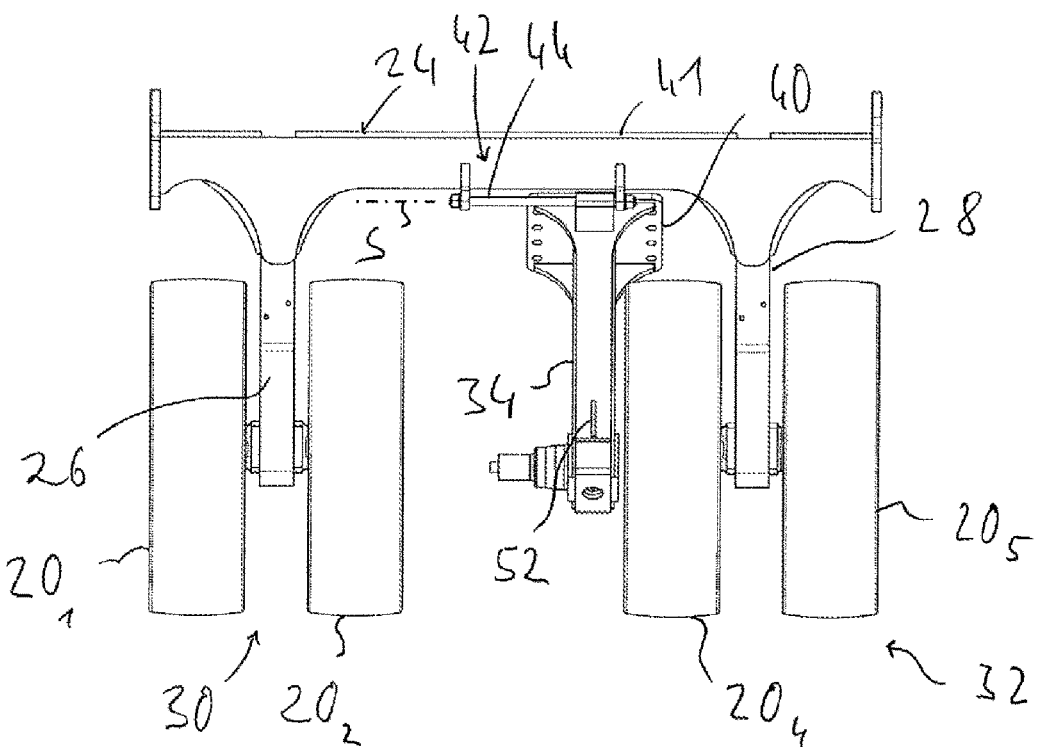
FIG. 5 shows a view of the wheel assembly corresponding to FIG. 2 with the auxiliary assembly wheel removed.
Figure 6:
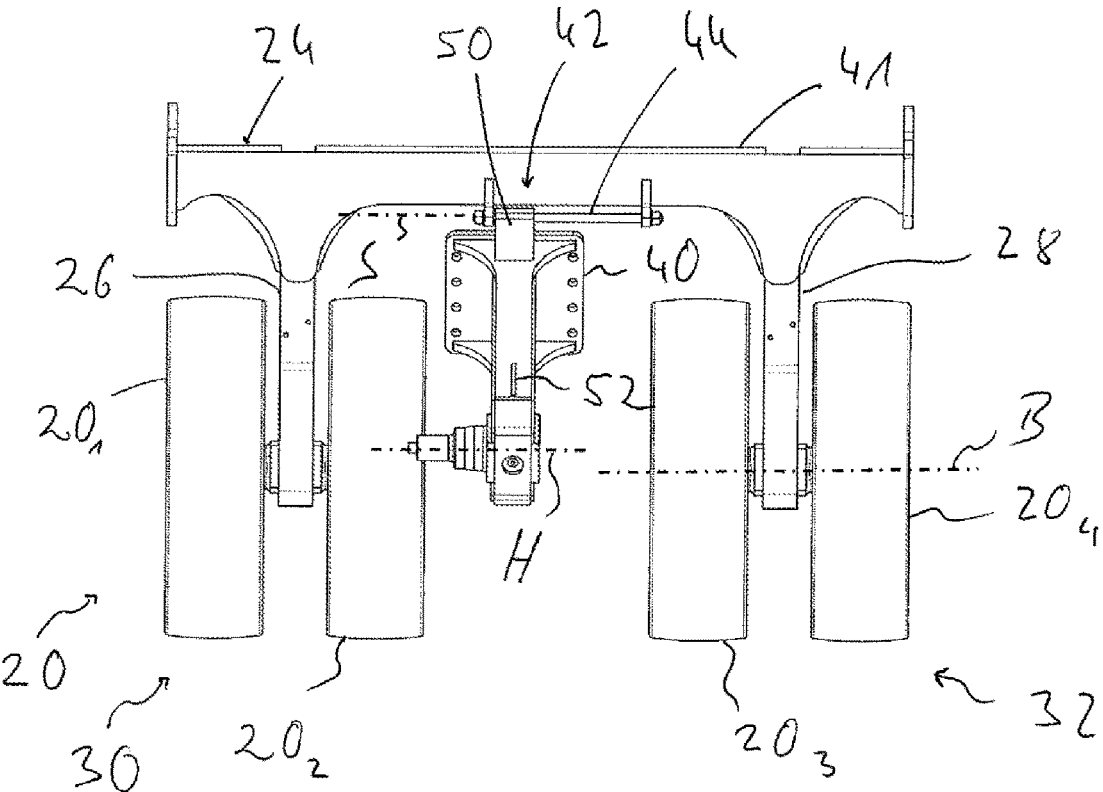
FIG. 6 shows a representation corresponding to FIG. 5 with the auxiliary wheel carrier displaced in the direction of a pivot axis.

To carry out maintenance work or repair work on wheels $20_2$ or $20_3$ or on the auxiliary assembly wheel $20_5$ or to change at least one of these wheels, the fixed coupling of the auxiliary wheel carrier 34 to the main wheel carrier 24 can be removed for an auxiliary wheel carrier 34 in the auxiliary wheel operating state by loosening the fastening elements 38. The auxiliary wheel carrier is then in its auxiliary wheel assembly state, in which it is coupled to the main wheel carrier 24 only by means of the pivot coupling region 42. By pivoting the auxiliary wheel carrier 34 about the pivot axis S and/or by displacing the auxiliary wheel carrier 34 along the pivot axis S, it can, as indicated in FIGS. 3 and 4, be pivoted or displaced towards an assembly position in which the auxiliary assembly wheel $20_5$ is moved out of alignment with the other wheels $20_1$, $20_2$, $20_3$, $20_4$ of the wheel assembly 16 such that the auxiliary wheel axis of rotation H no longer coincides with the operating wheel axis of rotation B. Since, as indicated in FIG. 4, the pivot axis S is offset by an offset V with respect to the operating wheel axis of rotation B transversely to a vertical direction R, a pivoting of the auxiliary wheel carrier 34 in the direction of the assembly position basically results in that initially the auxiliary wheel 20₅ is lowered with respect to the other wheels 20₁, 20₂, 20₃, 20₄ of the wheel assembly 16. In order to make this possible, the soil compactor 10 must first be raised, at least in the area of the wheel assembly 16, to carry out such work, so that there is a distance A between the wheels 20 of the wheel assembly 16 and the soil U on which the soil compactor 10 is located, which distance enables the pivoting and, at the same time, initially the lowering of the auxiliary assembly wheel 20₅.

The auxiliary wheel carrier 34 can then be pivoted together with the auxiliary assembly wheel 20₅ completely out of the area of the other wheels 20₁, 20₂, 20₃, 20₄ of the wheel assembly 16. If, for example, the second wheel 20₃ is to be changed, after the auxiliary assembly wheel 20₅ has been pivoted completely out of the area of the other wheels, the auxiliary wheel carrier 34 can be displaced in the direction of the pivot axis S towards the first pair of wheels 30 until the auxiliary assembly wheel 20₅ at least partially overlaps the first wheel 20₂ in the direction of the operating wheel axis of rotation B. The auxiliary assembly wheel 20₅ can then be supported on the outer periphery of the first wheel 20₂. No further measures are required to hold the auxiliary wheel carrier 34 or the auxiliary assembly wheel 20₅ in this assembly position. Alternatively or for increased safety, a chain or the like can be hooked into an eyelet 52 of the auxiliary wheel carrier 34, by means of which chain the auxiliary wheel carrier 34 is held in the assembly position.

After the maintenance or assembly work has been carried out or a wheel has been changed, the auxiliary wheel carrier 34 can be moved back or pivoted back into a position in which it can be firmly coupled to the main wheel carrier 24 by means of the fixed coupling region 36 and the fastening elements 38 of same, so that the auxiliary wheel axis of rotation H again corresponds to the operating wheel axis of rotation B and all wheels 20 of the wheel assembly 16 can again rotate about the common operating wheel axis of rotation B.

Figure 7:
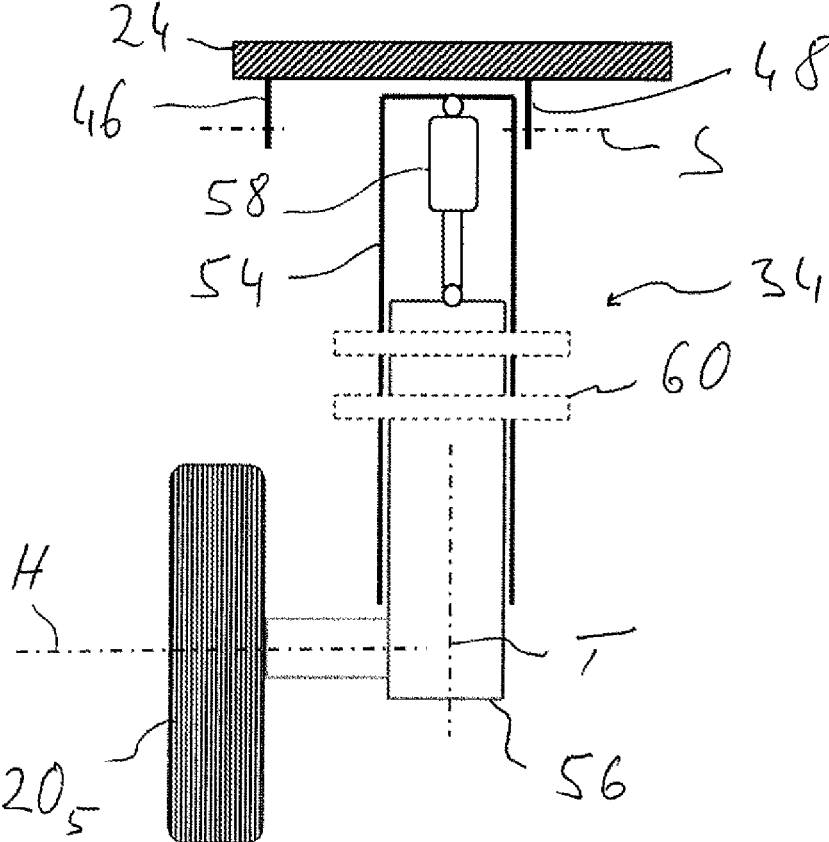
FIG. 7 shows an alternative embodiment of an auxiliary wheel carrier for a wheel assembly.

In order to avoid lifting the soil compactor 10 in the region of the wheel assembly 16 in order to move the auxiliary wheel carrier 34 or the auxiliary assembly wheel 20₅ mounted thereon into the assembly position, the auxiliary wheel carrier 34 can be designed to be variable in length, as shown in FIG. 7. For this purpose, the auxiliary wheel carrier 34 can in particular be designed to be telescopic and have a first auxiliary wheel carrier element 54 which is mounted on the main wheel carrier 24 such that it can pivot about the pivot axis S. A second auxiliary wheel carrier element 56 that can be displaced in the direction of a longitudinal axis T of the auxiliary wheel carrier can be provided on or in the first auxiliary wheel carrier element 24. By means of an actuator 58, for example a piston/cylinder assembly that can be pressurized with pressurized fluid, the two auxiliary wheel carrier elements 54, 56 can be displaced relative to one another in the direction of the longitudinal axis T of the auxiliary wheel carrier, in order to thereby change the length of the auxiliary wheel carrier 34 and thus the distance between the pivot axis S and the auxiliary wheel axis of rotation H.

In order to ensure stable, defined positioning of the two auxiliary wheel carrier elements 54, 56 in the auxiliary wheel operating state, they can be firmly coupled to one another by one or more coupling components 60. These coupling components 60 can be designed, for example, as coupling bolts passing through the two auxiliary carrier elements 54, 56. To change the length of the auxiliary wheel carrier 34, these coupling components 60 can be removed, whereupon the second auxiliary wheel carrier element 56 can be pulled toward or into the first auxiliary wheel carrier element 54 by activating the actuator 58. As a result, the auxiliary assembly wheel 20₅ lifts off the soil U, while the other wheels 20₁, 20₂, 20₃, 20₄ of the wheel assembly 16 remain on the soil U. Subsequently, as already explained above, the auxiliary wheel carrier 34, and with it the auxiliary assembly wheel 20₅, can be brought into its assembly position by pivoting about the pivot axis S or displacing in the direction of the pivot axis S.

Finally, it should be pointed out that when the operating wheel axis of rotation B is discussed in the context of the present invention, this is basically the wheel axis of rotation about which the wheels of a wheel assembly rotate when a soil compactor is traveling straight ahead, i.e., in the non-articulated state. In the embodiment of a wheel assembly described above and shown in the figures, in which, for example, the main wheel carrier 24 for steering the soil compactor is mounted on the compactor frame 28 of same so that it can pivot about a steering axis, all wheels of such a wheel assembly rotate about the common operating wheel axis of rotation B in the steering state, as well.

Figure 2:
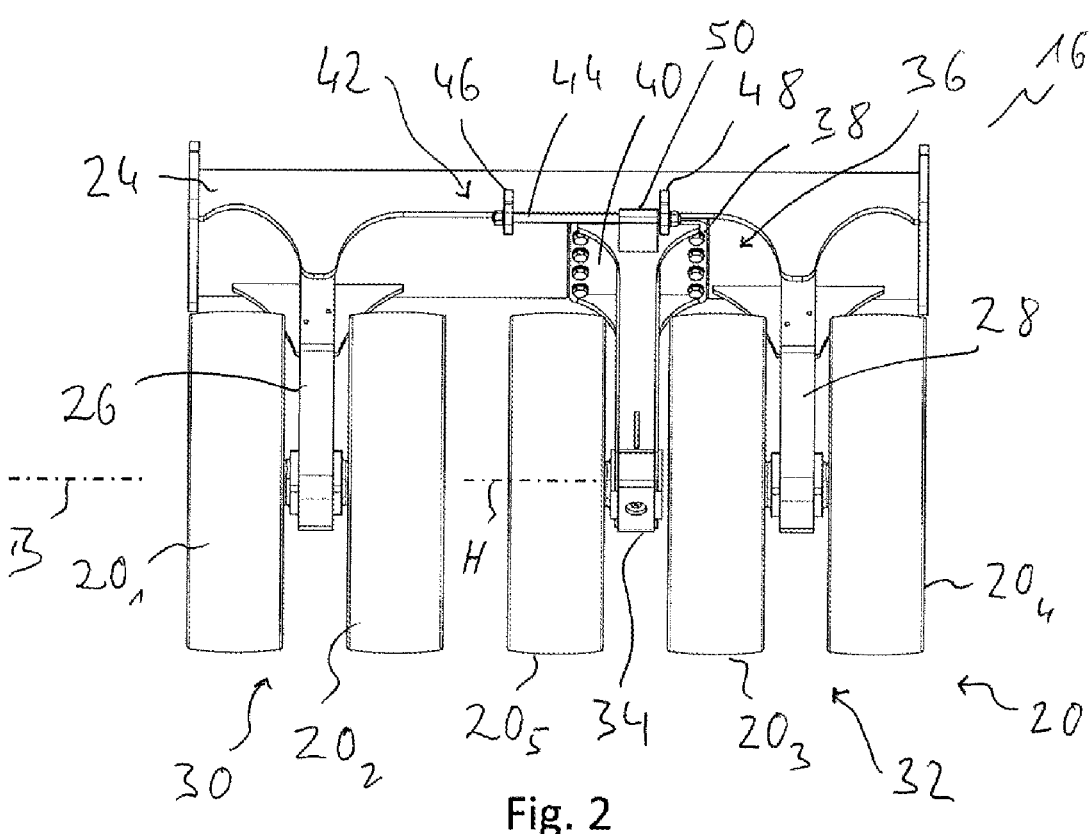
FIG. 2 shows a wheel assembly for the soil compactor of FIG. 1.

In principle, with the wheel assembly shown in FIG. 2, it could also be provided that the wheels 20₁, 20₂ of the first pair of wheels 30, which wheels are mounted on the wheel pair carrier 26, are mounted on the main wheel carrier 24 so as to pivot about a steering axis assigned to this carrier, and the wheels 20₃, 20₄ of the second pair of wheels 32, with the wheel pair carrier 28 thereof together with the auxiliary wheel carrier 34 and the auxiliary assembly wheel 20₅ mounted thereon, are mounted on the main wheel carrier 24 via an auxiliary frame so as to be pivotable about a separate steering axis. In these two subgroups of wheels, all wheels again rotate about the common operating wheel axis of rotation B when traveling is straight ahead. When a steering movement is carried out, however, the two subgroups pivot about different steering axes, so that the operating wheel axes of rotation of the two subgroups differ in the steering state.

The invention claimed is:

1. A wheel assembly for a soil compactor, comprising a plurality of wheels mounted in succession on a main wheel carrier in the direction of an operating wheel axis of rotation, wherein at least one third wheel, which is arranged between a first wheel and a second wheel in the direction of the operating wheel axis of rotation, forms an auxiliary assembly wheel and is mounted on the main wheel carrier by an auxiliary wheel carrier, wherein the auxiliary wheel carrier is firmly coupled to the main wheel carrier in an auxiliary wheel operating state and is pivotable about a pivot axis and displaceable in the direction of the pivot axis in relation to the main wheel carrier in an auxiliary wheel assembly state, wherein the pivot axis is oriented substantially parallel to the operating wheel axis of rotation.

2. The wheel assembly according to claim 1,
wherein the auxiliary wheel carrier is firmly coupled in a fixed coupling region to the main wheel carrier in the auxiliary wheel operating state by a plurality of coupling elements.

3. The wheel assembly according to claim 2,
wherein the fixed coupling region comprises at least one first coupling plate on the auxiliary wheel carrier and at least one second coupling plate, which is coupleable to the at least one first coupling plate by the coupling elements, on the main wheel carrier.

4. The wheel assembly according to claim 1,
wherein the auxiliary wheel carrier is coupled to the main wheel carrier in a pivot coupling region so that is pivotable about the pivot axis and be displaced in the direction of the pivot axis.

5. The wheel assembly according to claim 4,
wherein the pivot coupling region comprises a pivoting/sliding shaft, which is longitudinally extended in the direction of the pivot axis, on the main wheel carrier and at least one pivoting/sliding sleeve, which is guided on the pivoting/sliding shaft so as to be pivotable about the pivot axis and displaceable in the direction of the pivot axis, on the auxiliary wheel carrier.

6. The wheel assembly according to claim 5,
wherein the pivoting/sliding shaft is mounted on the main wheel carrier in each of its axial end regions by a shaft carrier element.

7. The wheel assembly according to claim 1,
wherein the pivot axis is offset transversely to a vertical direction with respect to the operating wheel axis of rotation.

8. The wheel assembly according to claim 1,
wherein the auxiliary wheel carrier is variable in length to change a distance between the pivot axis and an auxiliary wheel axis of rotation of the at least one auxiliary assembly wheel mounted on the auxiliary wheel carrier.

9. The wheel assembly according to claim 8,
wherein the auxiliary wheel carrier comprises a first auxiliary wheel carrier element, which is mounted on the main wheel carrier so as to be pivotable about the pivot axis and be displaced in the direction of the pivot axis, and a second auxiliary wheel carrier element, which is displaceable on the first auxiliary wheel carrier element essentially in the direction of an auxiliary wheel carrier longitudinal axis with respect to the first auxiliary wheel carrier element.

10. The wheel assembly according to claim 9,
wherein the second auxiliary wheel carrier element is lockable in an operating displacement position with respect to the first auxiliary wheel carrier element, and/or that the second auxiliary wheel carrier element is displaceable with respect to the first auxiliary wheel carrier element by an actuator.

11. The wheel assembly according to claim 1,
wherein a first pair of wheels is mounted on the main wheel carrier by a first wheel pair carrier, in that a second pair of wheels is mounted on the main wheel carrier by a second wheel pair carrier, and in that a wheel of the first pair of wheels forms the first wheel and a wheel of the second pair of wheels forms the second wheel.

12. The wheel assembly according to claim 1,
wherein the auxiliary wheel carrier is firmly coupled in a fixed coupling region to the main wheel carrier in the auxiliary wheel operating state by a plurality of coupling elements.

13. The wheel assembly according to claim 12,
wherein the fixed coupling region comprises at least one first coupling plate on the auxiliary wheel carrier and at least one second coupling plate, which is coupleable to the at least one first coupling plate by the coupling elements on the main wheel carrier.

14. A soil compactor comprising at least one wheel assembly according to claim 1.

15. The soil compactor according to claim 14,
wherein two wheel assemblies are arranged one after the other in a longitudinal direction of the soil compactor on a compactor frame, wherein the wheels of a first wheel assembly of the two wheel assemblies are offset with respect to the wheels of a second wheel assembly of the two wheel assemblies in a soil compactor longitudinal direction which is substantially orthogonal to the soil compactor longitudinal direction.

16. A method of carrying out maintenance work or repair work at a soil compactor, said soil compactor comprising at least one wheel assembly, said at least one wheel assembly comprising a plurality of wheels mounted in succession on a main wheel carrier in the direction of an operating wheel axis of rotation, wherein at least one third wheel, which is arranged between a first wheel and a second wheel in the direction of the operating wheel axis of rotation, forms an auxiliary assembly wheel and is mounted on the main wheel carrier by an auxiliary wheel carrier, wherein the auxiliary wheel carrier is firmly coupled to the main wheel carrier in an auxiliary wheel operating state and is pivotable about a pivot axis and displaceable in the direction of the pivot axis in relation to the main wheel carrier in an auxiliary wheel assembly state, wherein said pivot axis is oriented substantially parallel to the operating wheel axis of rotation;

wherein said method is for carrying out maintenance work or repair work at said first wheel or said second wheel of said at least one wheel assembly and comprises the steps of:

a) loosening fastening elements firmly coupling said auxiliary wheel carrier to said main wheel carrier in said auxiliary wheel assembly state for providing said auxiliary wheel mounting state;

b) pivoting said auxiliary wheel carrier in said auxiliary wheel mounting state about said pivot axis for moving said auxiliary wheel out of alignment with said first and second wheels, such that an auxiliary wheel axis of rotation no longer coincides with said operating wheel axis of rotation;

c) displacing said auxiliary wheel carrier with said auxiliary wheel being pivoted out of alignment with said first and second wheels in the direction of the pivot axis.

* * * * *